Patented Mar. 10, 1925.

1,529,035

UNITED STATES PATENT OFFICE.

OLIVER C. RALSTON AND GEORGE S. TILLEY, OF BERKELEY, CALIFORNIA.

PROCESS FOR PURIFICATION OF ALUMINUM SALTS.

No Drawing.   Application filed January 20, 1923.   Serial No. 614,037.

*To all whom it may concern:*

Be it known that we, (1) OLIVER C. RALSTON and (2) GEORGE S. TILLEY, citizens of the United States, residing at (1) Berkeley, (2) Berkeley, in the county of (1) Alameda, (2) Alameda, and State of (1) California, (2) California, have invented certain new and useful Improvements in Processes for Purification of Aluminum Salts, of which the following is a specification.

Aluminum salt solutions, obtained by dissolving crude aluminous materials in acids or other suitable reagents, and the solid aluminum salts obtained therefrom ordinarily are contaminated by iron salts or compounds derived from the raw material in quantity depending upon the purity of the raw material used and the method of treatment. Since the raw materials from which aluminum salts are usually made, for instance, clay and bauxite, frequently contain titanium, the aluminum salt solutions and the solid aluminum salt obtained therefrom frequently contain in addition to iron compounds also titanium compounds.

This invention relates to an improved process for the purification of aluminum compounds, and particularly for the separation of pure aluminum compounds from mixtures thereof with iron and titanium compounds or either of them.

The invention will be described with particular reference to the preparation of pure aluminum salts or compounds from clay containing aluminum, iron, and titanium compounds, it being understood, however, that the invention is applicable for the purification of aluminum salts from either iron or titanium or both, regardless of the source of the impure salt.

The invention is based upon the determination of the solution conditions, particularly the acidity or alkalinity or, in other words, the hydrogen ion or hydroxyl ion concentration of a solution of aluminum, iron, and titanium salts or any two of said salts best suited for their separation.

Since the hydrogen ion concentration and the hydroxyl ion concentration in a solution are inseparably related, only the hydrogen ion concentration of the solution will be referred to hereinafter, it being understood that a measure of the hydrogen ion concentration of the solution may be regarded as an index of the hydroxyl ion concentration of the solution.

To prepare a crude solution of an aluminum salt, an aluminous material, such as clay, is treated with a suitable solvent, such as sulfuric acid, in the well known manner. Assuming that the solution obtained contains aluminum sulfate, iron sulfate, and titanium sulfate, the titanium is first removed by boiling the solution while its hydrogen ion concentration is such that the voltage between a platinized oxygen electrode immersed in the solution and a calomel electrode made up with normal potassium chloride and connected with the solution by a suitable salt bridge is between 0.51 and 0.43 volts. By boiling the solution having the defined hydrogen ion concentration, the titanium salt hydrolyzes to a large extent forming an insoluble compound, probably metatitanic acid, which precipitates and may be separated by filtration in a state of comparative purity. The titanium precipitate so obtained may be calcined or otherwise treated as desired to produce titanium oxid or other desired titanium compound as a final product.

If titanium is not present in the solution or if its recovery or removal is not required, the foregoing step is omitted. It will of course be understood that the principal novelty in the foregoing step is the determination of the acidity or hydrogen ion concentration of the solution at which titanium may be selectively precipitated.

For the separation of the iron and aluminum content of the solution the iron must first be brought to the ferric condition. This is accomplished in any well known or suitable way, for instance, by aeration or by the use of suitable oxidizing agents, such as manganese dioxid or nitric acid.

The hydrogen ion concentration of the solution is then brought to within the range indicated by a potential difference of from 0.6 to 0.4 volts measured between a platinized oxygen electrode immersed in the solution and a calomel electrode made up with normal potassium chloride and connected with the solution by a suitable salt bridge. Within this hydrogen ion concentration range the iron salt hydrolyzes to the hydroxid which goes into colloidal solution, while the aluminum salt remains in true solution. The solution is then treated in one of two ways. If the solution is stored for several days or agitated, for instance, by aeration for a much shorter time or repeatedly filtered, the colloidal iron coagulates and may then be separated from the solution by filtration, leaving an iron-free alumiuum salt solution from which the solid aluminum salt may be recovered by well known methods.

Instead of coagulating the colloidal iron and separating it from the solution by filtration, the solution may be concentrated by evaporation at elevated temperature to a point at which upon cooling aluminum sulfate will crystallize out. When the solution is cooled and the aluminum sulfate crystallized the iron remains in colloidal solution and does not enter into or adhere to the aluminum sulfate crystals, but is substantially completely separated therefrom along with the mother liquor by filtration or by centrifuging.

While the separation of iron from the aluminum salt may be accomplished with satisfactory results at any hydrogen ion concentration within the range indicated by a potential difference of from 0.6 to 0.4 volts as defined, we have found a more limited preferred range of hydrogen ion concentration within which the separation of iron from the aluminum salt is more nearly perfect. The limited hydrogen ion concentration range referred to is a range within which the iron will exist in true solution when the solution is hot and in colloidal solution when the solution is cold and is defined or indicated by a potential difference of from 0.484 to 0.506 volts measured between a platinized oxygen electrode immersed in the solution and a calomel electrode made up with normal potassium chloride and connected with the solution by a suitable salt bridge.

As has been stated above, the iron in colloidal solution will coagulate to a filterable solid in the course of time. The very minute particles of iron compound in colloidal solution when freshly formed presumably coagulate slowly, forming larger particles which eventually reach a size at which they may be separated from the solution by filteration. It also appears that the larger are the particles of colloidal iron the greater is their tendency to enter into or adhere to the aluminum sulfate crystals. It therefore follows that by crystallizing the aluminum sulfate from a solution in which the colloidal iron has been freshly formed and before it has had time to coagulate, a more nearly iron-free aluminum sulfate product will be obtained. Consequently, when the hydrogen ion concentration of the solution is within the limited range indicated by a potential difference of from 0.484 to 0.506 and the solution is heated and evaporated preparatory to crystallizing the aluminum sulfate, the iron is brought into true solution, and then when the solution is cooled the aluminum sulfate crystallizes out while the iron is passing into the colloidal condition, but before the colloidal iron has time to coagulate appreciably and contamination of the aluminum sulfate crystals with iron is minimized.

The hydrogen ion concentrations of the solution may be established in any suitable manner, for instance, by regulating the quantity of acid used for dissolving the raw aluminous material so that the resulting solution has the desired hydrogen ion concentration, or by the addition of acids or alkalies to the solution as required until the desired hydrogen ion concentration is established. Ordinarily an excess of acid is used in dissolving the aluminous raw material and it is therefore usually necessary to reduce the hydrogen ion concentration by the addition of an alkaline or neutralizing agent to the solution. Calcium carbonate is a satisfactory material for reducing the acidity or hydrogen ion concentration of the solution.

It is of course understood that the invention is not limited to the particular method of measuring the hydrogen ion concentration described. The invention is based upon the use of hydrogen ion concentration at which titanium salts are hydrolyzed and selectively precipitated by boiling the solution, while the iron salts are hydrolyzed to compounds forming colloidal solutions which are coagulated only by long standing, agitation or the like, and the aluminum salts are not appreciably hydrolyzed. Any suitable accurate method of measuring the hydrogen ion concentration may be used, such as for instance, titration methods.

We claim:

1. Process of separating iron and aluminum compounds which comprises forming a solution thereof in which the iron content is in ferric condition and in which the hydrogen ion concentration is such that the potential difference between a platinized oxygen electrode immersed in the solution and a normal calomel electrode electrically connected with the solution is from 0.600 to 0.400 volts, and crystallizing aluminum salt from said solution.

2. Process of separating iron and aluminum compounds which comprises forming a solution thereof in which the iron is in ferric condition and in which the hydrogen ion concentration is such that the potential difference between a platinized oxygen electrode immersed in the solution and a normal calomel electrode electrically connected with the solution is from 0.506 to 0.484 volts, concentrating said solution at elevated temperature, cooling said solution, and separating crystallized aluminum salt.

3. Process of separating soluble iron and aluminum compounds, which comprises establishing a hydrogen ion concentration in a solution thereof containing the iron in ferric condition such that the iron compound goes into colloidal solution, while the aluminum compound remains in true solution, and separating the aluminum compound from the resulting solution.

4. Process as defined in claim 3 in which the hydrogen ion concentration of the solution is such that the iron compound is hydrolyzed to a compound existing in true solution at elevated temperatures and in colloidal solution at lower temperatures, and in which the iron and aluminum components of said solution are separated by concentrating said solution at elevated temperatures, and crystallizing said aluminum compound by cooling said solution.

In testimony whereof, we affix our signatures.

OLIVER C. RALSTON.
GEORGE S. TILLEY.